Sept. 16, 1930. D. O. MARSHALL Re. 17,799

SHOE HEEL

Original Filed Aug. 29, 1928

INVENTOR:
DAVID O. MARSHALL
BY Bakewell & Church,
ATTORNEYS.

Reissued Sept. 16, 1930 Re. 17,799

UNITED STATES PATENT OFFICE

DAVID O. MARSHALL, OF FAIRFIELD, ILLINOIS, ASSIGNOR TO MOUND CITY WOOD HEEL & MFG. CO., OF ST. LOUIS, MISSOURI, A CORPORATION OF MISSOURI

SHOE HEEL

Original No. 1,738,715, dated December 10, 1929, Serial No. 302,828, filed August 29, 1928. Application for reissue filed June 30, 1930. Serial No. 465,007.

This invention relates to shoe heels of the type that comprise a core of wood or other relatively inexpensive material covered with leather or other suitable non-metallic sheet material that is connected to the core by an adhesive.

It is quite common in the manufacture of women's shoe heels of the type mentioned to form the covering of the heel from two pieces of leather or other material that are joined together by a seam which is disposed vertically at the rear side of the heel.

One objection to heels constructed in this manner is that the seam of the outer covering forms a ridge on the heel that destroys its symmetry and detracts from the appearance of the heel. Even when great care and skill are exercised in applying the covering material to the core, the seam above referred to is apt to be crooked and uneven and it is apt to be offset slightly with relation to the longitudinal axis of the heel, thereby preventing the seam at the rear side of the heel from lining up properly with the back seam of the shoe to which the heel is applied.

The main object of my invention is to overcome in a simple and inexpensive manner the above described inherent defects of a shoe heel provided with a covering formed from pieces of material that are joined together by a seam.

To this end I have devised a covered shoe heel whose core is provided with a groove disposed so that the seam which joins the two pieces of material that constitute the covering of the heel will lie in said groove, and thus cause the outer surface of the heel to be smooth and free from a ridge or raised portion. The said groove not only serves as a recess for the seam of the outer covering and prevents said seam from destroying the symmetry of the heel, but it simplifies the operation of covering the core of the heel by eliminating the step of rubbing down the seam and by controlling the shape and outline of the seam and the position of said seam with relation to the longitudinal axis of the heel. For example, if the groove in the core is disposed vertically at the center at the rear side of the heel, as will usually be the case, said groove effectively prevents the seam in the outer covering from becoming crooked and it prevents said seam from assuming a position slightly to the left or to the right of the exact center of the heel. The result is that when the heel is attached to a shoe, the seam at the rear side of the heel will be absolutely straight and in exact longitudinal alignment with the back seam of the shoe.

Figure 1 of the drawings is a rear elevational view of the core of my improved shoe heel before the covering material has been applied to the same.

Figure 1:
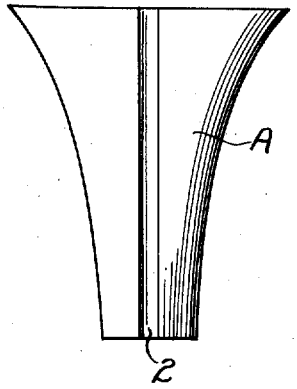
Figure 3:
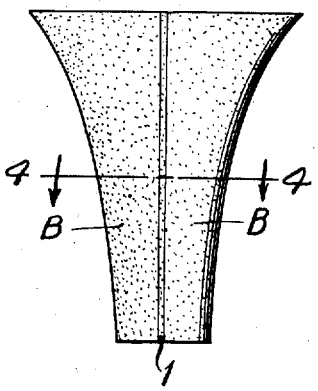
Figure 3 is a rear elevational view of the finished heel.
Figure 2:
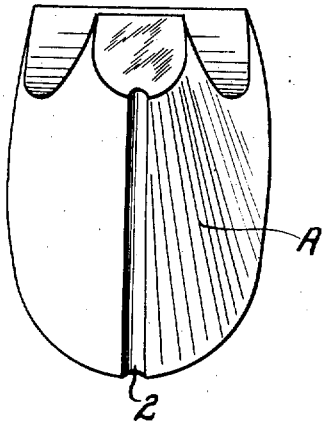
Figure 2 is a bottom plan view of said core.
Figure 4:
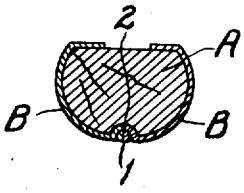
Figure 4 is a horizontal sectional view, taken on the line 4—4 of Figure 3.

In the drawings A designates the core of a covered shoe heel, which core will usually be constructed of wood or some other suitable material. Said core is provided with a covering which is herein illustrated as being formed from two pieces of leather or other suitable non-metallic material B, joined together by a sewed seam 1, and connected to said core by an adhesive, said seam 1 being located at the rear side of the heel and extending vertically throughout the entire height of the heel. The core A is provided at its rear side with a vertically-disposed groove 2 that is located at the center of the core and which is of such cross-sectional shape and dimensions that when the covering is applied to the core, the seam 1 of the covering will lie in said groove, as shown in Figure 4.

The groove 2 not only serves as a pocket or recess for the seam 1, which prevents said seam from destroying the symmetry of the heel, but it holds said seam in shape and locates it in such a position that when the heel is attached to a shoe, the seam at the rear side of the heel will be in exact longitudinal alignment with the back seam of the shoe.

Still another advantage of a shoe heel of the construction above described is that the covering material can be applied to the same in less time than is possible with a conventional covered shoe heel, due to the fact that less skill and care are required on the part of the operator in applying the covering material to the core, due, of course, to the fact that the groove 2 in the core automatically centers the covering material with relation to the core.

Having thus described my invention, what I claim as new and desire to secure by Letters Patent, is:

1. A shoe heel, comprising a core, a covering for said core composed of a plurality of non-metallic sheet pieces of material joined together by a sewed seam, said covering being secured to the core by an adhesive, and means in the rear side of said core for determining the shape and location of said seam and for preventing said seam from forming a ridge or projection on the exterior of the heel.

2. A shoe heel, comprising a core, a covering for said core secured to same by an adhesive and composed of a plurality of non-metallic sheet pieces of material joined together by a sewed seam, and a groove in the rear side of said core for receiving said seam.

3. A shoe heel, comprising a core, a covering for said core composed of a plurality of non-metallic sheet pieces of material joined together by a sewed seam, and a vertically-disposed groove located at the center of the rear side of the core for receiving said seam, said covering being secured to the core by an adhesive.

4. A shoe heel core provided with a vertically-disposed groove, located at the center of the rear side of the core, substantially as described.

DAVID O. MARSHALL.